United States Patent [19]
Wang

[11] Patent Number: 5,481,103
[45] Date of Patent: Jan. 2, 1996

[54] PACKET BAR CODE WITH DATA SEQUENCE ENCODED IN ADDRESS/DATA PACKETS

[75] Inventor: Ynjiun P. Wang, Fort Myers, Fla.

[73] Assignee: Metanetics Corporation, Fort Myers, Fla.

[21] Appl. No.: 280,490

[22] Filed: Jul. 26, 1994

[51] Int. Cl.$^6$ ............................................. G06K 19/06
[52] U.S. Cl. ........................ 235/494; 235/454; 235/462
[58] Field of Search ............................. 235/494, 454, 235/462

[56] References Cited

U.S. PATENT DOCUMENTS

| | | | |
|---|---|---|---|
| 4,982,074 | 1/1991 | Ogasawara | 235/454 |
| 5,157,687 | 10/1992 | Tymes | 235/462 X |
| 5,235,172 | 8/1993 | Oehlmann | 235/494 |

FOREIGN PATENT DOCUMENTS 384955A  5/1990  European Pat. Off. .

*Primary Examiner*—Donald T. Hajec
*Assistant Examiner*—Michael G. Lee
*Attorney, Agent, or Firm*—Kenneth P. Robinson

[57] ABSTRACT

A machine readable code in a form such as a bar code uses self-addressed address/data packets which can be positioned in arbitrary orders and configurations. Additional benefits, such as ability to use extended scan angles for decoding and reduction in required code management data, also result from the self-contained nature of the address/data packet components of packet codes. A sequence of data is separated into units of data which are encoded in data portions of packets each also including an address portion which identifies the position of such data unit relative to the original sequence of data. The individual packets may then be positioned in a wide variety of configurations, rectangular and otherwise, with the individual packets in any order, sequential or otherwise. Even where packets are aligned in an extended row, the usable scan angle range is determined by the width to height aspect ratio of individual packets and not limited by the much higher aspect ratio of the row of packets. Methods and systems for encoding and decoding packet codes are described.

32 Claims, 6 Drawing Sheets

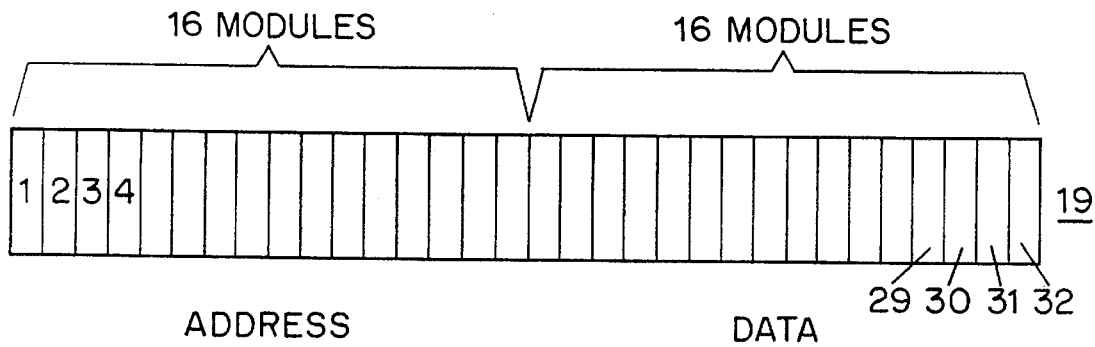
FIG. 4
FIG. 5
| BASE 10 REPRESENTATION OF 10 BITS | UNIQUE 16 MODULE PATTERN |
|---|---|
| 1 | PATTERN 1-DATA |
| 2 | PATTERN 2-DATA |
| 3 | PATTERN 3-DATA |
| 1022 | PATTERN 1022-DATA |
| 1023 | PATTERN 1023-DATA |
| 1024 | PATTERN 1024-DATA |
FIG. 6

| ECC LEVEL AND NUMBER OF PARITY BYTES ||
|---|---|
| ECC LEVEL (5-BIT) | NUMBER OF PARITY BYTES |
| 0..24 | (ECC+1)*2 |
| 25 | 54 |
| 26 | 60 |
| 27 | 70 |
| 28 | 80 |
| 29 | 90 |
| 30 | 100 |
| 31 | 128 |

| NOB | | |
|---|---|---|
| NOB | NUMBER | LEVELED |
| 0 | 1 | YES |
| 1 | 2 | YES |
| 2 | 3 | YES |
| 3 | 4 | YES |
| 4 | 5 | YES |
| 5 | 2 | SEQUENTIAL |
| 6 | 3 | SEQUENTIAL |
| 7 | 4 | SEQUENTIAL |

PACKET BAR CODE WITH DATA SEQUENCE ENCODED IN ADDRESS/DATA PACKETS

This invention relates to providing data in a machine readable form, such as a bar code, and more particularly to packet code formats enabling (i) extended scan angle range, (ii) reduction in code management instructions and (iii) flexibility in arrangement and configuration of a graphic machine readable image, relative to prior types of two-dimensional bar codes.

BACKGROUND OF THE INVENTION

Applications for one-dimensional (1-D) bar codes are well known and widespread. Techniques for encoding and decoding such codes are well known and may be accomplished relatively simply. Typically, there is a very limited need for inclusion of code management instruction or "overhead" data necessary to manage aspects of the decoding process. While only a limited total amount of data may be encoded in a 1-D bar code, the format is quite robust and in reading a printed bar code an adequate range of scan angles can be employed. Thus, if the 1-D bar code has a width in a horizontal direction, the maximum scan angle (relative to the horizontal direction) at which all bar code elements are traversed will depend upon the height of the bar code elements. For a reasonable aspect ratio (ratio of width to height), a diagonal scan across the bar code will traverse all of the elements for angles typically up to plus or minus 30 degrees from the horizontal.

Various forms of two-dimensional (2-D) bar codes are also known. Such codes typically provide significantly increased data storage capacity, with accompanying increases in complexity of encoding and complexity of decoding, requirements for a large increase in necessary overhead data, and severe reduction of the scan angle range usable without production of partial scans. The increased overhead data requirements relate to identifying the content of the 2-D code so as to enable reliable decoding, as well as to other aspects of decoding.

The reduction in usable scan angle range may result partially from the use of bar elements with less height to reduce the overall size of a 2-D bar code. Primarily, however, when a large number of individual bar elements are placed in series the length of the row of code elements gets much longer, so that, unless the height of each element is proportionally increased, the aspect ratio of the line of bar elements becomes much larger. A larger aspect ratio accommodates only a diagonal scan at a small angle from horizontal, if partial scans are to be avoided by always scanning all elements in decoding a line of elements. As an alternative, a larger range of acceptable scan angles may be achieved by accepting partial scans of a line of elements and stitching the partial scans together to provide the full scans required for successful decoding of the bar code. However, reliable stitching together of partial scans requires sophisticated decoding circuitry and the inclusion of significantly more overhead data in order to provide enough information to enable identification and successful stitching of the appropriate partial scans in order to form a complete scan of each row of bar elements in the 2-D bar code.

Objects of the present invention are, therefore, to provide new forms of packet codes, and methods and arrangements for encoding and decoding such code forms, which enable provision of machine readable images characterized by one or more of the following:

large data capacity with relatively low overhead data requirements;

a configuration consisting of a plurality of small self-addressed portions, or "packets" which can be read individually in any order;

flexibility of data arrangement in consecutive or non-consecutive order;

flexibility in arrangement and configuration in non-rectangular or other shapes;

a relatively large scan angle range determined by individual packet aspect ratio, independently of the overall row length or aspect ratio of rows of the complete machine readable image; and simplified decoding and code reader requirements.

SUMMARY OF THE INVENTION

In accordance with the invention, a packet code, in the form of a machine readable bar code, includes a plurality of nominally rectangular address/data packets each including a series of bar type elements spaced in a first width direction. In the packet code, each of the address/data packets includes (a) a data portion representative of a data unit selected from a sequence of data, and (b) an address portion identifying the position of the data unit relative to the sequence of data to enable reassembly of data units into proper positions in the sequence of data independently of the order in which the address/data packets are read and decoded.

Also in accordance with the invention, a method of forming a packet code, wherein a sequence of data is encoded in a plurality of machine readable packets, comprises the steps of:

(a) parceling the sequence of data into a number of data units;

(b) forming a plurality of address/data packets, each including a data portion representative of one of the data units and an address portion identifying the position of the data unit relative to the sequence of data to enable reassembly of data units into proper positions in the sequence of data independently of the order in which the address/data packets are read and decoded;

(c) forming at least one instruction packet including a data portion representative of information as to at least one of (i) the total number of address/data packets included in the packet code, (ii) an error correction protocol, and (iii) a data compression protocol; and (d) positioning the address/data packets in a configuration characterized by inclusion of at least one of the following, at least two packets in a row extending in a first direction, and at least two packets in a column extending in a second direction nominally normal to the first direction.

Further in accordance with the invention, a method, of decoding a machine readable packet code including a plurality of address/data packets each having a data portion representative of a data unit of a sequence of data and an address portion identifying the position of the data unit in the sequence of data, comprises the steps of:

(a) generating a signal representative of an address/data packet;

(b) decoding the step (a) signal to recover a data unit and its address;

(c) storing the data unit in a manner enabling identification of its position in the sequence of data;

(d) determining the total number of address/data packets included in the complete packet code;

(e) repeating steps (a), (b) and (c) for other address/data packets;

(f) verifying that enough address/data packets have been decoded and stored;

(g) utilizing error correction to recover missing packets, if appropriate; and (h) providing an output signal representative of a selected part of the sequence of data as represented by recovered data units.

For a better understanding of the invention, together with other and further objects, reference is made to the accompanying drawings and the scope of the invention will be pointed out in the accompanying claims.

BRIEF DESCRIPTION OF THE DRAWINGS

FIG. 4 illustrates the code module complement of a single address/data packet of the FIG. 1 packet code.

FIG. 5 illustrates a preferred odd parity symbology for encoding the second, data portion, group of 16 modules of the FIG. 4 packet.

FIG. 6 shows a pattern table useful in mapping data permutations to module encoding.

DESCRIPTION OF THE INVENTION

Figure 1:
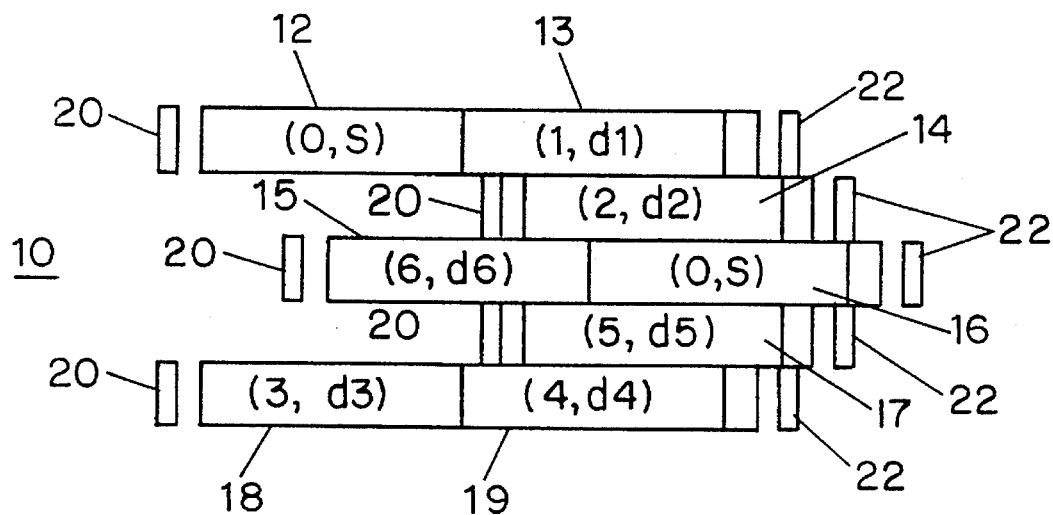
FIG. 1 is a simplified conceptual drawing of a packet code in accordance with the invention.

FIG. 1 is a conceptual drawing of an example of a packet code 10 in the form of a machine readable image which can be placed on a surface or other medium for subsequent reading (e.g., by scanning with a laser scanner or other suitable device) and decoding (e.g., recovery of the encoded information) in accordance with the invention. In FIG. 1, each of elements 12–19 forming the packet code 10 is a code unit, or packet, typically comprising a series of bars and spaces of different reflectivity, which may be of the general type commonly comprising a 1-D bar code. The actual make-up of the individual packets 12–19 will be described in greater detail.

A number of basic characteristics and areas of flexibility of packet codes pursuant to the invention can be noted with reference to the FIG. 1 example. Each of packets 13–15 and 17–19 is an address/data packet including a data portion representative of a data unit selected from a sequence of data to be encoded and an address portion identifying the position of the respective data unit relative to the overall sequence of data to be encoded. For this purpose, a sequence of data can initially be parceled into a number of data units of predetermined length, with one data unit encoded into each of a like number of address/data packets. As indicated in FIG. 1, in this example packet 13 includes the first portion of information, denoted at d1, and correspondingly includes an address portion denoted at 1, in the address/data notation (1, d1). As shown, some of the remaining address/data packets are in sequential order corresponding to the original sequence of data, e.g., (2, d2) follows (1, d1), while others are not, e.g., (6, d6) follows (2, d2) and (4, d4) is positioned in the last position. An additional characteristic of the FIG. 1 packet code is the inclusion of instruction packets 12 and 16 in the form of code units including code management information as to at least one of (i) the total number of data units (e.g., the total number of address/data packets) included in the complete packet code, (ii) an error correction protocol, (iii) a data compression protocol, and (iv) other relevant information relating to the code characteristics, configuration or decoding. In FIG. 1, instruction packets 12 and 16 are indicated to be identical and are positioned at a plurality of spaced locations for increased reliability. The zero address portion of these instruction packets distinguishes them from the address/data packets which carry portions of the encoded information. In other embodiments, additional packets (packets (1, d1) and (2, d2) for example) may also be used to encode code management information, as will be further described.

Another illustrated characteristic is the non-rectangular shape of packet code 10 in FIG. 1. In this implementation, the individual packets 12–19 can be arranged in a wide variety of configurations, provided basic rules of connectivity defined below are met, as illustrated in FIG. 1. In other implementations individual packets may be physically separated, provided provision is made to scan all packets comprising a particular packet code. An additional feature of the FIG. 1 configuration is the inclusion of a start pattern 20 at the start of each row of packets and a stop pattern 22 at the end of each row of packets. As an example, each start pattern 20 may comprise a binary 100 bar code element combination and each stop pattern 22 may comprise a binary 1101 representation. The inclusion of start and stop patterns is an optional feature which may be included in selected implementations in order to facilitate reading of the packet code and may be excluded as unnecessary in other implementations.

In FIG. 1, the address/data and instruction packets 12–19 are not arranged in uniform rows and columns (i.e., rectangular configuration) as would be typical for a prior art 2-D bar code. The FIG. 1 packets are actually in neither uniform rows and columns nor in sequential order, as already discussed. However, in other configurations the packets may be arranged in a rectangular format similar to prior types of 2-D bar codes, with the address/data packets in sequential order, or not, as desired. In such configurations, packets may be arranged in rows extending in a first (horizontal) direction and in columns extending in a second direction nominally normal to the first direction. For purposes hereof, "nominally" is defined as within plus or minus 20 percent of an indicated quantity or relationship.

An important point is that in all of these available configurations the range of scan angles usable for reading the packet code, without reliance on partial scans, is determined by the individual packet dimensions and aspect ratio. In a typical 2-D bar code of the prior art, the series combination of packets 18 and 19 would result in a combined bar code row having twice the width and aspect ratio of a single unit and thereby having a scan angle range reduced by about one-half. Thus, if a 1-D bar code had a width to height aspect ratio permitting all bar elements to be scanned by scanning within a scan angle range of plus or minus 20 degrees from horizontal, two such 1-D bar codes placed in series would have to be scanned within a scan angle range of about plus or minus 10 degrees in order to scan all bar elements. Of course, the plus or minus 20 degree scan angle range could be maintained for the two 1-D bar codes in series, if the height of each bar code were doubled. However, 2-D bar codes, which have basic characteristics similar to the assembly of rows and columns of a large number of 1-D bar codes, are intended to permit the encoding of a large amount of information in a relatively small area. Therefore, doubling or otherwise significantly increasing the height of each bar element in a 2-D bar code is destructive of the basic objective and is not a practical solution to increasing the scan angle range in a 2-D bar code. In contrast, with the present invention each packet is effectively self-contained. Since each packet incorporates address information it can be scanned independently of any other packet and there is no diminution of the basic scan angle range.

Another way of expressing this is to observe that in prior art types of 2-D bar codes a plurality of code word bar-space combinations are positioned in a row in series in the same sequence in which the incorporated information appears in the original input information (i.e., synchronously positioned). Each such row of code words is then stacked in sequence with other rows of code words positioned in series (i.e., synchronously stacked). In decoding, in order to reliably recover the encoded data and reconstruct the original input information with all portions present in the correct order, each line of code words must be read in a synchronized manner so that the code word sequence is maintained. In order to accomplish such synchronized reading and decoding, it is typically required either (a) that each complete line of code words be covered by a single scan, or (b) that arrangements be made to process partial scans. As already indicated, alternative (a) requires that the operator and/or sensor equipment be capable of providing accurate alignment to accomplish scanning within a relatively narrow scan angle range resulting from the very high aspect ratio of an extended line of bar elements in a 2-D bar code. On the other hand, alternative (b) requires that computer programming and increased overhead data be provided in order to accomplish sophisticated stitching together of partial line scans. The self-contained nature of address/data packets in accordance with the present invention avoids both of these alternatives. An adequate scan angle range is maintained and there is no requirement for synchronized scanning of code words in any particular order. Each packet can be scanned independently in any order and the scan angle range is determined by the aspect ratio of a single packet.

PACKET STRUCTURE

Figure 2:
FIG. 2 shows one embodiment of a packet code in accordance with the invention.
Figure 3:
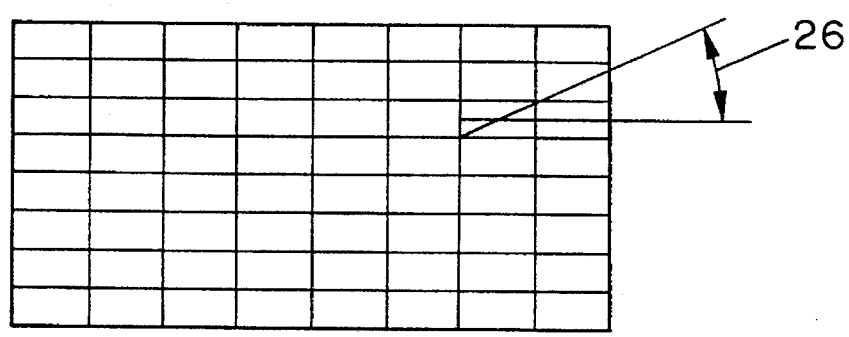
FIG. 3 is an outline drawing of a packet code illustrating the scan angle range of the entire packet code as determined by the aspect ratio of a single included address/data packet.

FIG. 2 shows a sample of a packet code provided in a rectangular format in accordance with the invention. This configuration includes start and stop codes 20 and 22, as discussed. The FIG. 2 sample includes 7 rows, each of which includes 6 address/data packets. Referring to FIG. 3, there is shown in simplified outline an eight by eight packet code format, with the individual packets represented by rectangles. In FIG. 3 there is indicated the maximum scan angle 26 at which the composite packet code in this configuration can be read without stitching together multiple scan lines to build an image of the data. Note that angle 26 is a significantly greater angle than the corresponding maximum scan angle which would pertain if a whole row had to be decoded at once.

Referring now to FIG. 4, in a currently preferred embodiment, each packet is a mark/space pattern (e.g., 1-D bar code type pattern) that is 32 modules wide. Each module may comprise a mark to represent a binary zero or comprise a space to represent a binary one (i.e., each module may be marked or unmarked). In this embodiment, the first, 16 modules represent the packet's address and the last 16 modules represent ten bits of data. There are $2^{16}$ or 65,536 permutations of mark/space patterns for 16 modules. However, ten bits of binary data comprises only 1,024 permutations of ones and zeros. The 1,024 valid mark/space combinations that represent the ten bits of data will all comprise 4 bars and 4 spaces whereby each bar and space is a maximum of 5 modules wide. Additionally, the total count of marked modules for the data portion may be arranged to always be an odd number. This is referred to as a (16, 5, 4, odd parity) symbology. FIG. 5 shows one such pattern of (16, 5, 4, odd parity) symbology. Each module has a fixed width equal to "X". Each bar and space has a width that is a whole number multiple of "X". Those skilled in the art will appreciate that limiting valid mark/space addresses to only a portion of all possible permutations of marks and spaces creates an inherent error correction characteristic.

In this preferred embodiment the maximum quantity of unique packets for encoding the address in the symbol is 1024. Therefore, of the 65,536 possible combinations of mark/space patterns, only 1024 are necessary for the address portion. Again, the chosen patterns will all be four bars and four spaces with a maximum width of five modules. However, to distinguish the valid address patterns from the valid data patterns, the address patterns may be designated to provide even parity. Even parity means that the summation of marked modules will be even. In implementation of the invention, a pattern table, as shown in FIG. 6 may be used to map a unique (16, 4, 5, odd parity) mark/space pattern to each of the 1024 permutations of ten bits of binary data. A separate pattern table (not shown) may be used to map a unique (16, 4, 5, even parity) mark/space pattern to each of the 1024 possible data packet addresses.

The use of odd or even parity pattern combinations (or both odd and even parity patterns as in the example just described) is a matter of design choice. In a currently preferred embodiment odd parity combinations are used for both the address portion and the data portion of packet codes.

Figures 7, 8, 9:
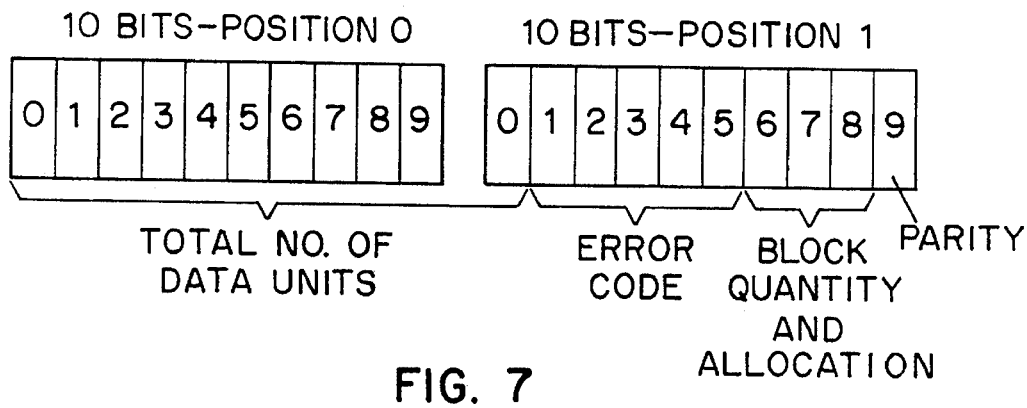
FIG. 7 is useful in describing encoding of packet code management information.
FIG. 8 is a form of table useful in mapping error correction protocol levels to code numbers.
FIG. 9 is a form of table useful in matching the number of blocks of data to a leveling system.

In this example, the first three data packets, addressed zero, one, and two are utilized for data that represents characteristics of the stacked bar code itself. FIG. 7 is a diagram of the data stored in the first two bits, addressed zero and one. The ten bits of data from packet zero and the first bit of data from packet one contain the total length of the file in bytes. The next five bits from packet one, bits one through five, identify an error correcting protocol. The error correcting protocol is identified by a binary number from zero to thirty-one which represents the particular error correcting protocol which was used to encode the data file. A table such as the one shown in FIG. 8, is used to map an error correcting protocol to its code number. FIG. 8 indicates various levels of a known type of Reed-Solomon error correction and a corresponding code, by way of example. Because this error correction protocol breaks the data file into blocks of data of up to 255 bytes, the next three bits of packet one, bits six through eight as shown in FIG. 7, contain the total quantity of blocks and the block allocation. The number stored is the number from the number of blocks (NOB) column of the table shown in FIG. 9, which matches the quantity of blocks and the leveling system used. The last bit from packet one is a logical layer indicator. If no compression algorithm or protocol was used to compress the data file, this bit will be zero. However, if the data file is a compressed file, this bit will be one. In this example, a code representative of the compression algorithm used, if any, will be encoded into the packet which includes the address portion denoting address number two.

ENCODING AND DECODING

A preferred embodiment of the packet code of this invention has a maximum capacity of 1280 bytes of information. Referring to the flowchart of FIG. 10, the first step in encoding the data file is to encode the sequence of data into blocks in accordance with an error correction protocol, as represented by step 31. Using the currently preferred error correction scheme, Reed-Solomon, each block includes a maximum capacity of 255 bytes. Because each block can contain up to 255 bytes the total quantity of blocks necessary is easily determined by dividing the total sequence of data to be encoded by 255 and rounding the fractional remainder up to the nearest whole quantity of blocks necessary. The quantity of data in each block may be either leveled or sequenced. "Leveled" indicates that each block should contain the same quantity of data. If the data can not be evenly divided into the blocks, the higher number blocks will contain one less byte than lower number blocks as necessary. "Sequenced" indicates that each lower numbered block should contain the maximum quantity of data, 255 bytes, and the last block should contain the remaining data. The quantity of blocks and the leveling scheme map to a unique NOB number as per the table in FIG. 9.

At step 32, each block is then parceled into ten bit data units for encoding into data packets. At step 33, a sequential address is assigned to each ten bit segment of data beginning with the address three, or 0000000010 in ten bit binary. At step 34, the (16, 4, 5, odd parity) pattern encoding table at FIG. 6 is used to find the four bar and four space pattern which corresponds to the ten bits of data. At step 36, a (16, 4, 5, even parity) pattern table is used to find a four bar and four space pattern which corresponds to the sequential address. At step 38, the data is provided for the first two data packets which contain the information about the size of the data file and the encoding techniques used. At step 39, the appropriate four bar and four space pattern is selected for each data segment and its corresponding address. At step 40, a representation of the encoded data is placed or otherwise embodied on a substrate, surface, paper label, etc., by printing, engraving or otherwise fixing an image representative of each packet, comprising data and its corresponding address, in a machine readable medium.

Figure 10:
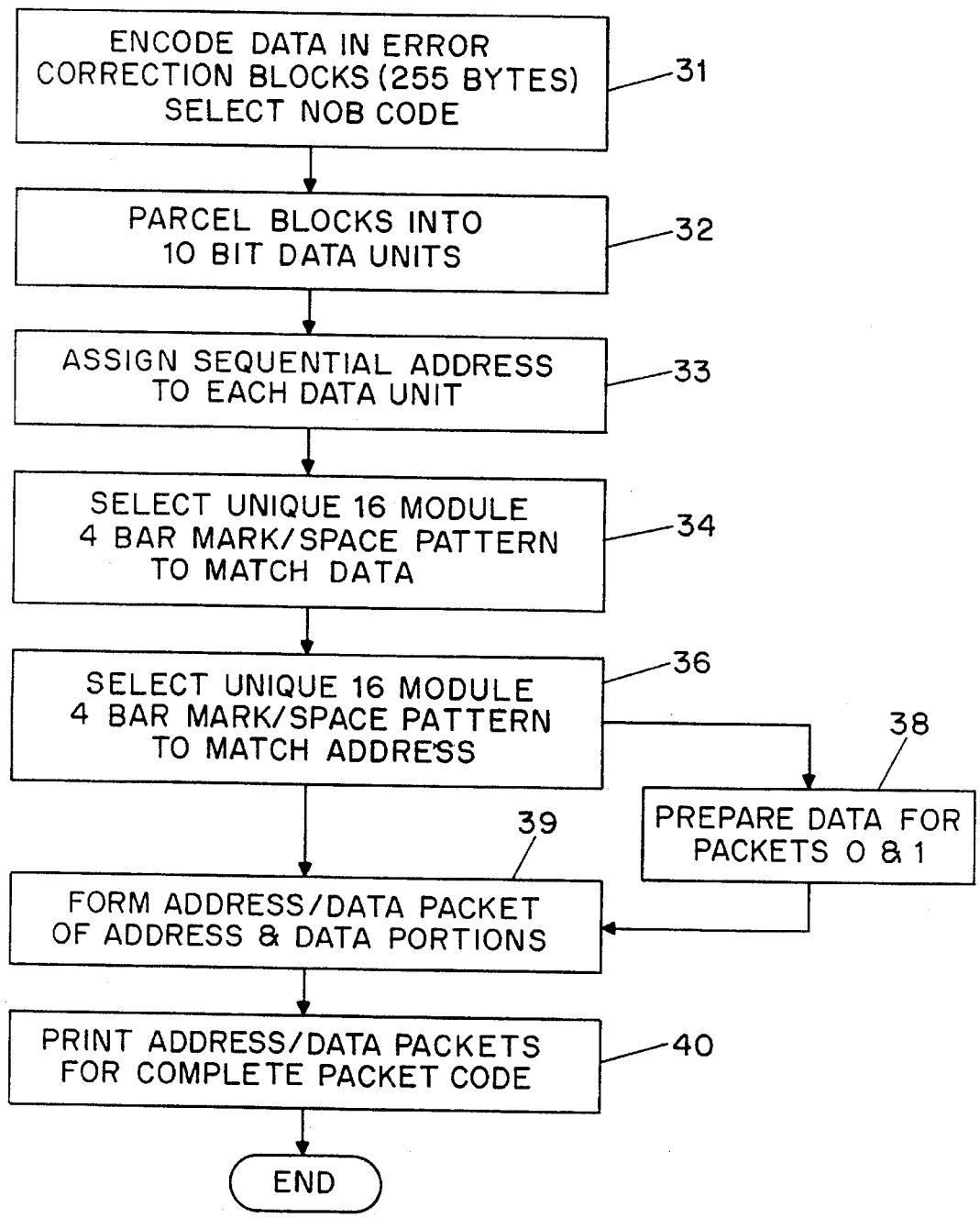
FIG. 10 is a flowchart useful in describing a packet code encoding method in accordance with the invention.
Figure 11:
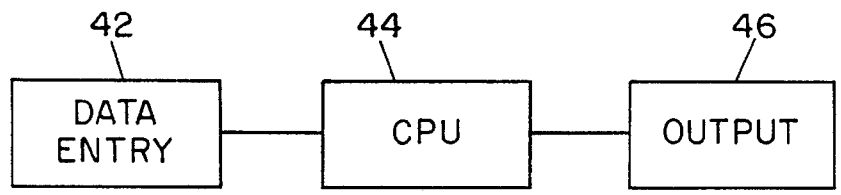
FIG. 11 is a block diagram of an encoding system usable to implement the FIG. 10 method.

A block diagram of a system for encoding a machine readable packet code in accordance with the invention is shown in FIG. 11. As illustrated, the encoding system includes a data entry device 42, which may be a keyboard, data scanner, input terminal, or other device arranged to enable a sequence of data to be entered. The FIG. 11 system also includes a processing unit 44 coupled to data entry device 42 and arranged to encode address/data packets pursuant to the flowchart as shown in FIG. 10 or to variations thereof in accordance with the invention. Unit 44 may be a suitably programmed microprocessor-based central processing unit (CPU) or other appropriate data processing unit. The encoding system, as illustrated, also includes an output device 46 arranged to print out or otherwise provide the packet code in machine readable form. Output device 46 may typically be a printer, engraver or unit for producing holographic or photographic images.

Figure 12:
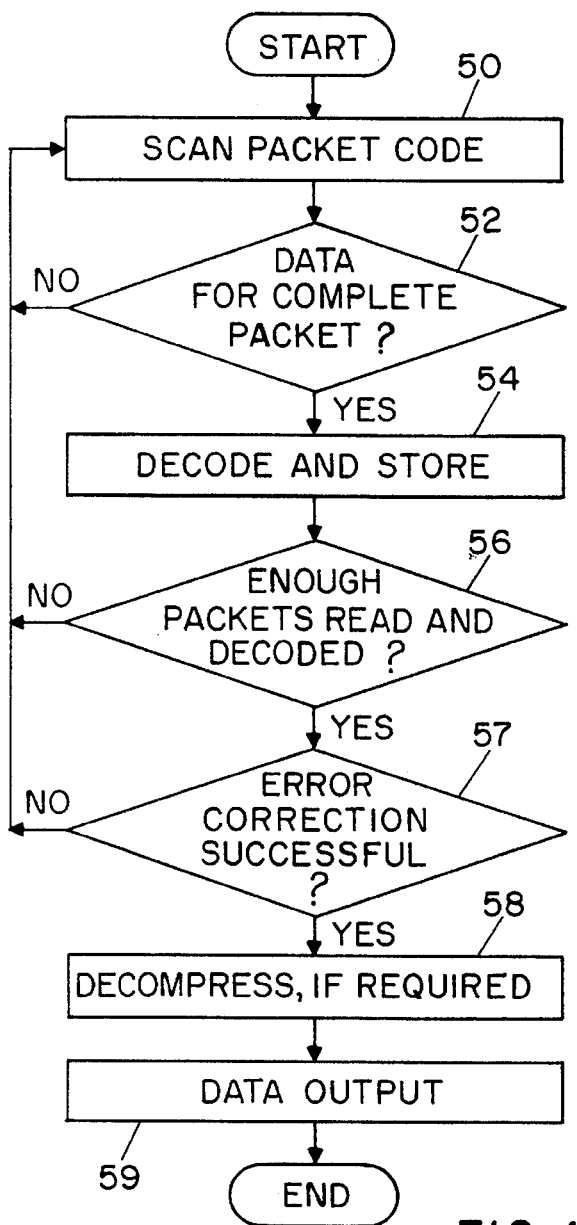
FIG. 12 is a flowchart useful in describing a packet code decoding method in accordance with the invention.
Figure 13:
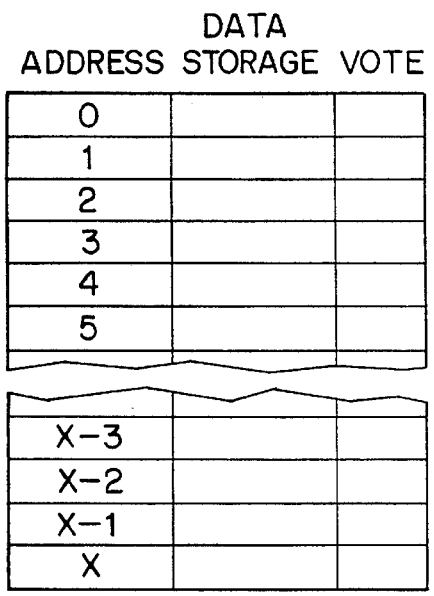
FIG. 13 is a form of table useful in storing decoded data units in proper sequence.

A significant benefit of the invention is that data stored in a packet code may be retrieved by very simple decoding methods, such as illustrated in the flowchart of FIG. 12. At step 50, a linear scan, at an arbitrary angle within the scan angle range, is implemented to detect a mark space pattern across the symbol. At step 52, the mark/space data is evaluated to determine if any of it represents a complete packet. In the current example, this evaluation comprises verifying that a 32 module wide sample contains a 16 module wide valid address code portion adjacent to a 16 module wide valid data code portion. If there exist valid data packets in the data as read, at step 54, the packets are decoded and the decoded data stored. Such storage may be facilitated by use of a linear array providing decoded data storage at the appropriate space corresponding to the decoded data unit's address in the sequence of input data. Such a linear array is graphically shown in FIG. 13. If data already exists at the array position corresponding to the address accompanying a newly decoded data unit, a voting system can be used to verify the accuracy of the previous data unit storage.

One form of voting system comprises incrementing the vote count for an address when a decode results in agreement between the decoded data unit and the data unit previously stored at the particular address and decrementing the vote count if the two do not agree. If the vote count drops below zero, the stored data is replaced with the newly decoded data and the vote count is reset to one. At step 56, a verification check is made as to whether enough of the array of decoded data has been filled to enable the sequence of data to be reconstructed, with use of error correction if necessary. This verification is always "No" in this example until the packets addressed zero and one, which contain information representative of the length of the portable data file, are read and decoded. However, the data representation in packets addressed zero and one is determined before encoding the packet code with error correction, with the result that it is possible to recover the zero and one packets using error correction techniques. This may be carried out as follows, if the zero and/or one address packets are not found after a predetermined number of scans. An iterative approach is used to attempt to determine the content of the missing zero or one packet:

1) select a default error correction protocol;
2) set the number of packets to the highest number actually found;
3) recover a trial zero and/or one packet via the error correction protocol;
4) test whether the trial packets actually match the remainder of the data recovered;
5) if a match is obtained, the missing content has been determined;
6) if no match is obtained—repeat the process with use of other error correction protocols, or a higher total number of packets, or both. The foregoing is useful in attempting to determine missing zero and one packets when those packets are originally encoded using known types of systematic encoding, but probably not with scrambling encoding.

If the entire array is full or if enough address/data packets have been decoded and stored, scanning is terminated. At step 57, bits one through five of the data at address one are read to determine the error correction key and enable use of the error correction protocol, if necessary. At step 58, the last bit of the data stored at address one is checked to determine if the data is compressed and, if necessary, decompress the data as per the appropriate algorithm or protocol. At step 59, the information stored in the portable data file is coupled out for use, processing or transmitted to another location. With an understanding of the invention, those skilled in the art will appreciate that the data encoded in a valid data packet may be temporarily stored, encoded or decoded, in a variety of devices equivalent to the preferred embodiment's one dimensional array without departing from the scope of this invention. It will also be appreciated that, while the use of consecutively ordered types of tables and linear arrays are described for encoding and storing decoded data, such functions may be implemented under computer control without actually storing data in any specific order or format.

Figure 14:
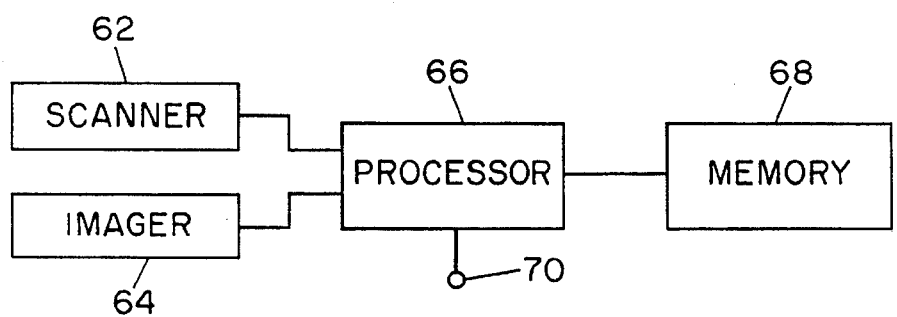
FIG. 14 is a block diagram of a system for decoding a packet code in accordance with the invention.

A block diagram of a system for decoding a machine readable packet code in accordance with the invention is illustrated in FIG. 14. As shown, the decoding system includes a sensor device, such as laser scanner 62 or photodetector type imaging system 64, arranged to read address/data packets of a packet code provided pursuant to the invention. The system also includes a processor unit 66, such as a suitable form of CPU, arranged to decode output signals from the sensor device 62 or 64 to recover data units and their respective addresses. The decoding system of FIG. 14 further includes a memory 68 coupled to processor unit 66 and arranged to store data units in a manner enabling identification of their respective positions in the sequence of data. Memory 68 may be any suitable form of data storage device appropriate for storing and providing access to decoded data in desired sequences. In operation of the FIG. 14 system, processor unit 66, in combination with memory 68, is arranged to implement the decoding method of the flowchart of FIG. 12 or variations thereof in accordance with the invention. The system further includes an output device 70, such as an output port, radio transmitter, printer or other device arranged to provide access to a selected part (e.g., all or a portion) of the sequence of data as represented by the recovered (scanned and decoded) data units.

OTHER ASPECTS

Figure 15A:
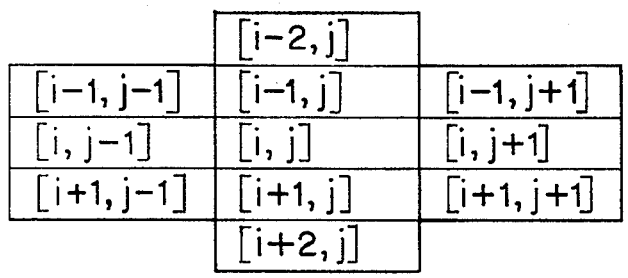
FIGS. 15a, b and c are connectivity diagrams useful in describing aspects of embodiments of the invention.
Figure 15B:
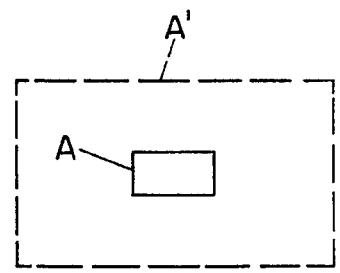
Figure 15C:
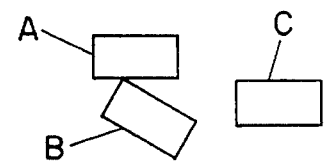

Referring now to FIG. 15a, there is illustrated a packet code connectivity diagram defining the limits and requirements of interconnection applicable to the total complement of address/data packets comprising one complete packet code in accordance with one preferred embodiment of the invention. For this purpose, interconnection is defined by FIG. 15a. In FIG. 15a, each of the packets shown is connected to the centrally positioned packet [i, j]. For this embodiment, all of the packets comprising the packet code must be connected pursuant to FIG. 15a and clustered. The term clustered means that the packets connected pursuant to FIG. 15a must be continuous in a single chain. It will also be noticed that the connectivity and clustering requirements in this embodiment of rectangular packets also yields the result that for bar code type machine readable elements all of the elements of all of the address/data packets will be aligned in parallel. As discussed above, in other embodiments the address/data packets may be arranged in separated or other configurations, provided the necessity of an arrangement to provide reader access to all of the packets of a packet code is addressed in appropriate manner within the range of techniques available to persons skilled in the art. For example, FIG. 15b is a representation of a connectivity zone arrangement whereby in the packet code reading and decoding process packet A is considered to be connected to all other packets falling at least partially within a connection zone A' of predetermined size surrounding packet A. Thus, with reference to FIG. 15c, in this embodiment address/data packets B and C are "connected" to packet A and would be read and decoded as parts of the packet code which includes packet A, because they fall partially within the connection zone A' associated with packet A.

Figure 16:
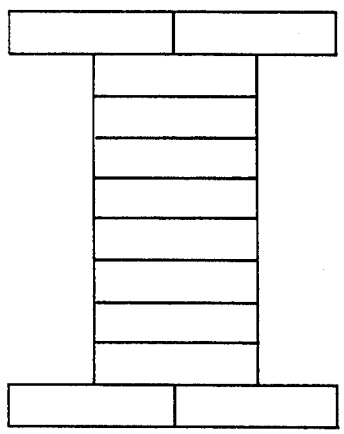
FIGS. 16 and 17 show packet code configurations which provide a visual indication of packet code content or other factor.
Figure 17:
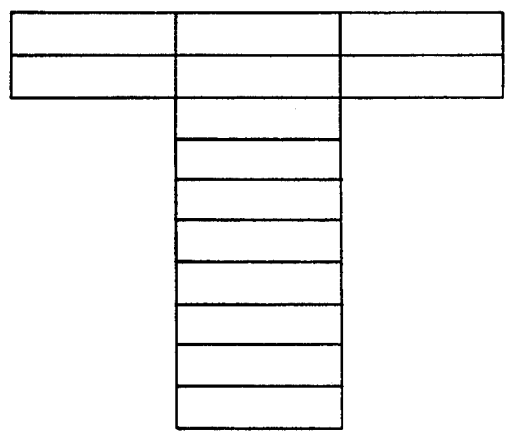

Consistent with the earlier description, packets may be randomly positioned, enabling packet code configurations such as shown in FIGS. 16 and 17. This enables the packet code to directly communicate some desired information to human observers. For example, invoice data relating to a shipment can be incorporated in the FIG. 16 "I" configuration and appropriate technical data can be provided in the FIG. 17 "T" configuration. With advance notice of the system used, a recipient may thus be notified of the general content of a particular packet code. This configuration flexibility may also be employed in many other applications for trademark, advertising, adaptation to limited usable surface space, etc. Prior types of 2-D bar codes do not provide comparable configuration flexibility.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of forming a packet code, wherein a sequence of data is encoded in a plurality of machine readable packets, comprising the steps of:
    (a) parceling said sequence of data into a number of data units;
    (b) forming a plurality of address/data packets, each including a data portion representative of one of said data units and an address portion identifying the position of said data unit relative to said sequence of data to enable reassembly of data independently of the order in which said address/data packets are read and decoded; and
    (c) forming at least one instruction packet including a data portion representative of information as to at least one of (i) the total number of address/data packets included in said packet code, (ii) an error correction protocol, and (iii) a data compression protocol.

2. A method of forming a packet code as in claim 1, wherein each said machine readable packet has the basic form of a one-dimensional bar code including a series of elements of different reflectivity.

3. A method of forming a packet code as in claim 1, additionally comprising the following step:
    (d) positioning said address/data packets in a configuration characterized by inclusion of at least two packets in a row extending in a first direction and at least two packets in a column extending in a second direction nominally normal to said first direction.

4. A method of forming a packet code as in claim 3, wherein step (d) comprises positioning said address/data packets in one of (i) a random order and (ii) a predetermined non-sequential order.

5. A method of forming a packet code as in claim 3, wherein step (d) comprises positioning said address/data packets in one of (i) a rectangular configuration and (ii) a predetermined non-rectangular configuration.

6. A method of forming a packet code as in claim 1, additionally comprising the following step:

(d) positioning said address/data packets in a configuration characterized by inclusion of each packet at least partially within a connection zone associated with at least one other packet.

7. A method of forming a packet code as in claim 1, additionally comprising the following step:

(d) fixing said address/data packets in a medium enabling said packet code to be read by an optical scanning technique.

8. A method of forming a packet code as in claim 1, wherein each said machine readable packet has the basic form of a one-dimensional bar code including a series reflective elements comprising 32 modules and step (b) comprises forming address/data packets each including a 16 module address portion and a 16 module data portion.

9. A method of forming a packet code as in claim 1, wherein step (d) comprises forming each said instruction packet to include a series of reflective elements comprising 32 modules.

10. A method of forming a packet code scannable over an extended range of scan angles, comprising the steps of:

(a) parceling a sequence of data into a number of data units not exceeding a predetermined length;

(b) forming a plurality of address/data packets, each including a data portion representative of one of said data units and an address portion identifying the position of said data unit relative to said sequence of data, each said address/data packet comprising a series of bar and space elements arranged in a nominally rectangular configuration having a width in a first direction normal to said elements and a height enabling all of said elements to be scanned over a range of scan angles from said first direction to a maximum scan angle determined by the width to height aspect ratio of said address/data packet; and (c) positioning said address/data packets in a configuration including a plurality of said address/data packets in a row extending in said first direction to provide a packet code readable by scanning at any angle up to said maximum scan angle, without scan angle limitation resulting from the higher aspect ratio of said row of address/data packets.

11. A method of forming a packet code as in claim 10, wherein step (c) comprises positioning said address/data packets in one of (i) a random order and (ii) a predetermined non-sequential order.

12. A method of forming a packet code as in claim 10, wherein step (c) comprises positioning said address/data packets in one of (i) a rectangular configuration and (ii) a predetermined non-rectangular configuration.

13. A method of forming a packet code as in claim 10, wherein step (c) includes fixing said configuration in a medium enabling said packet code to be read by an optical scanning technique.

14. A method of forming a packet code as in claim 10, wherein each said address/data packet has the basic form of a one-dimensional bar code including a series of reflective elements comprising 32 modules and step (b) comprises forming address/data packets each including a 16 module address portion and a 16 module data portion.

15. A packet code, in the form of a machine readable bar code, comprising:

a plurality of nominally rectangular address/data packets each including a series of bar type elements spaced in a first width direction; and each of said address/data packets including:

a data portion representative of a data unit selected from a sequence of data; and an address portion identifying the position of said data unit relative to said sequence of data to enable reassembly of data units into proper positions in said sequence of data independently of the order in which said address/data packets are read and decoded.

16. A packet code as in claim 15, wherein said address/data packets are positioned in a configuration characterized by inclusion of at least two packets in a row extending in said first width direction and at least two packets in a column extending nominally normal to said first width direction.

17. A packet code as in claim 15, wherein each of said address/data packets has a similar nominally rectangular size and the complete packet code is readable by scanning within a scan angle range determined by the width to height aspect ration of a single address/data packet, independently of the aspect ratio of any row of packets extending in said first width direction.

18. A packet code as in claim 15, additionally comprising at least one instruction packet similar in construction to said address/data packets and including a data portion representative of information as to at least one of (i) the total number of address/data packets included in said packet code, (ii) an error correction protocol, and (iii) a data compression protocol.

19. A packet code as in claim 15, wherein said plurality of nominally rectangular address/data packets are arranged in a non-sequential order relative to said sequence of data.

20. A packet code as in claim 15, wherein said plurality of nominally rectangular address/data packets are arranged in a sequential order corresponding to said sequence of data.

21. A packet code as in claim 20, wherein said plurality of nominally rectangular address/data packets are arranged in one of a rectangular configuration and a selected non-rectangular configuration.

22. A method, of decoding a machine readable packet code including a plurality of address/data packets each having a data portion representative of a data unit of a sequence of data and an address portion identifying the position of said data unit in said sequence of data, comprising the steps of:

(a) generating a signal representative of an address/data packet;

(b) decoding said step (a) signal to recover a data unit and its address;

(c) storing said data unit in a manner enabling identification of its position in said sequence of data;

(d) repeating steps (a), (b) and (c) for other address/data packets; and (e) providing an output signal representative of a selected part of said sequence of data as represented by recovered data units.

23. A method of decoding a machine readable packet code as in claim 22, wherein step (a) additionally comprises verifying that said signal represents at least one entire address/data packet.

24. A method of decoding a machine readable packet code as in claim 22, additionally comprising between steps (c) and (d), a step as follows:

(w) reading data stored at a predetermined position to determine the total number of address/data packets included in said packet code.

25. A method of decoding a machine readable packet code as in claim 24, additionally comprising between steps (d) and (e), steps as follows:

(x) utilizing the total number of address/data packets as determined in step (w) to verify that enough address/data packets have been decoded and stored;

(y) determining the appropriate error correction protocol for restoring missing packets; and (z) utilizing error correction to restore said missing packets in said sequence of data.

26. A system, for decoding a machine readable packet code including a plurality of address/data packets each having a data portion representative of a data unit of a sequence of data and an address portion identifying the position of said data unit in said sequence of data, comprising:

a sensor device arranged to read address/data packets of said packet code;

a processor unit arranged to decode output signals from said sensor device to recover data units and their respective addresses;

a memory coupled to said processor unit and arranged to store said data units in a manner enabling identification of respective positions of said data units in said sequence of data; and an output device coupled to said processor unit and arranged to provide access to a selected part of said sequence of data as represented by decoded data units.

27. A system as in claim 26, wherein said processor unit is additionally arranged to determine the total number of said address/data packets included in a packet code and verify that all of said address/data packets have been decoded and stored in said memory.

28. A system as in claim 26, wherein said sensor device is one of a laser scanner and an imaging system utilizing photodetectors.

29. A system for encoding a machine readable packet code including a plurality of address/data packets, comprising:

a data entry device arranged to enable a sequence of data to be entered;

a processing unit coupled to said data entry device and arranged to encode a plurality of address/data packets, each including a data portion representative of a data unit of said sequence of data and an address portion identifying the position of said data unit in said sequence of data; and an output device arranged to provide a machine readable representation of said plurality of address/data packets.

30. A system as in claim 29, wherein said processing unit is additionally arranged to determine the relative positioning of each said address/data packet in said machine readable representation and provide control signals to said output device representative of said relative positioning.

31. A system as in claim 30, wherein said processing unit is arranged to provide control signals effective to result in a machine readable representation in which said address/data packets are arranged in one of a sequential order and a selected non-sequential order.

32. A system as in claim 30, wherein said processing unit is arranged to provide control signals effective to result in a machine readable representation in which said address/data packets are arranged in one of a rectangular format and a selected non-rectangular format.

* * * * *